US011804143B1

(12) United States Patent
DePaolo et al.

(10) Patent No.: US 11,804,143 B1
(45) Date of Patent: *Oct. 31, 2023

(54) LEARNING ENGINE APPLICATION

(71) Applicant: MASSACHUSETTS MUTUAL LIFE INSURANCE COMPANY, Springfield, MA (US)

(72) Inventors: Damon Ryan DePaolo, Barkhamsted, CT (US); Payton A. Shubrick, Springfield, MA (US); Emilia Daniela Holban, Clinton, MA (US); Jiby John, Suffield, CT (US); Gerald Lee, Windsor, CT (US); Deepak Jagasia, Chicopee, MA (US); Cheri Kevane, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 65 days.

This patent is subject to a terminal disclaimer.

(21) Appl. No.: 17/233,913

(22) Filed: Apr. 19, 2021

Related U.S. Application Data

(63) Continuation of application No. 15/803,465, filed on Nov. 3, 2017, now Pat. No. 10,984,666.

(60) Provisional application No. 62/417,142, filed on Nov. 3, 2016.

(51) Int. Cl.
| | | |
|---|---|---|
| G06F 16/33 | (2019.01) | |
| G09B 5/06 | (2006.01) | |
| G06F 16/335 | (2019.01) | |
| G06F 18/2415 | (2023.01) | |
| G06N 3/08 | (2023.01) | |
| G06N 20/00 | (2019.01) | |
| G06F 18/2134 | (2023.01) | |

(52) U.S. Cl.
CPC ............. *G09B 5/06* (2013.01); *G06F 16/337* (2019.01); *G06F 18/24155* (2023.01); *G06F 18/21342* (2023.01); *G06N 3/08* (2013.01); *G06N 20/00* (2019.01)

(58) Field of Classification Search
CPC ............................... G06F 16/337; G09B 5/06
See application file for complete search history.

(56) References Cited

U.S. PATENT DOCUMENTS

| | | | |
|---|---|---|---|
| 11,341,553 B1* | 5/2022 | Borunda | G06Q 30/0613 |
| 2006/0074788 A1* | 4/2006 | Grizack | G06Q 40/02 705/35 |
| 2007/0150428 A1 | 6/2007 | Webb | |
| 2007/0156479 A1 | 7/2007 | Long | |
| 2009/0119001 A1 | 5/2009 | Moussaeiff et al. | |
| 2009/0271287 A1* | 10/2009 | Halpern | G06Q 40/00 705/26.1 |
| 2009/0307088 A1* | 12/2009 | Littlejohn | G06Q 30/0255 705/14.66 |
| 2010/0023459 A1 | 1/2010 | Sundby | |

(Continued)

*Primary Examiner* — Mohammad S Rostami
(74) *Attorney, Agent, or Firm* — Foley & Lardner LLP

(57) ABSTRACT

Disclosed herein are systems and methods of artificial intelligence learning systems. In some embodiments the artificial intelligence system presents options to users based on their life stage and personality profile. Family or group structures may be created within an application. Options may be created and presented based on the family structure such as chores may be assigned to children, money may be transferred between family members, and scores may be assigned to different users.

20 Claims, 15 Drawing Sheets

(56) References Cited

U.S. PATENT DOCUMENTS

| | | | |
|---|---|---|---|
| 2010/0268629 A1* | 10/2010 | Ross | G06Q 10/10 |
| | | | 705/35 |
| 2012/0089410 A1 | 4/2012 | Mikurak | |
| 2012/0089535 A1* | 4/2012 | Hebela | G06Q 40/00 |
| | | | 705/36 R |
| 2012/0229625 A1 | 9/2012 | Calman et al. | |
| 2014/0156480 A1 | 6/2014 | Qaim-Maqami et al. | |
| 2017/0053353 A1* | 2/2017 | Groom | G06Q 40/06 |
| 2017/0200220 A1* | 7/2017 | Nicholson | G06F 3/04847 |
| 2017/0236215 A1* | 8/2017 | Eisen | G06N 20/10 |
| | | | 705/35 |
| 2018/0284735 A1* | 10/2018 | Cella | H04B 17/23 |
| 2019/0251593 A1* | 8/2019 | Allouche | G06Q 10/0639 |

\* cited by examiner

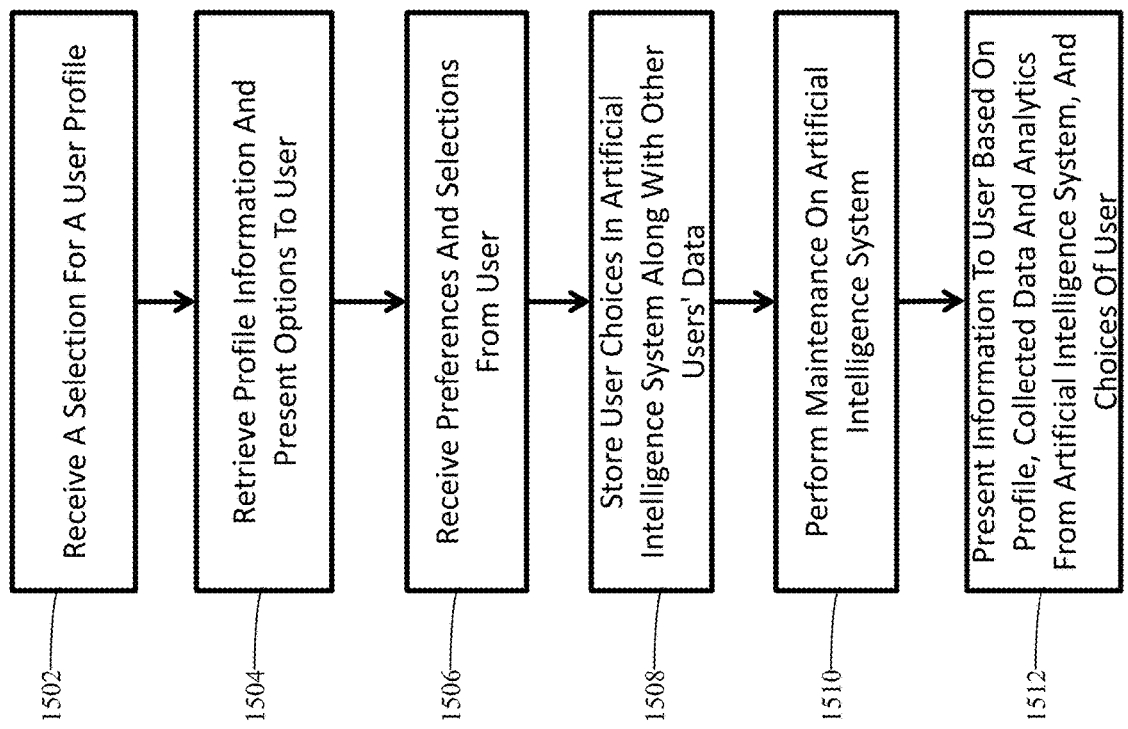

LEARNING ENGINE APPLICATION

CROSS-REFERENCE TO RELATED APPLICATIONS

This application is a continuation application of U.S. patent application Ser. No. 15/803,465, filed Nov. 3, 2017, which claims priority to U.S. Provisional Patent Application Ser. No. 62/417,142, filed Nov. 3, 2016, which is hereby incorporated by reference in its entirety.

TECHNICAL FIELD

This application relates generally to artificial intelligence and more specifically to a learning engines recommendation system.

BACKGROUND

Systems for goal management are often directed to users at specific life stages and do not dynamically adjust to changes in life stages. These systems may not learn from a user's preferences and account for changes over time. For example, a user that is 13 years old, versus when she is 17, has vastly different priorities and interests when it comes to finances. Similarly, a user that is 50 years old has different priorities than a 70 year old user. Additionally, financial advice is often overlooked and not specified to a user's needs. Conventional software applications are often not tailored to a user for managing goals.

SUMMARY

There is a need for a system to dynamically present a user with goal planning based on his/her needs and priorities over as the user's life stages evolve. Embodiments described herein enable single tap seamless data entry by need via a dynamic user interface that uses artificial intelligence for displaying goal management options. Embodiments describe how a user can transfer funds to family members or via a split account utilizing learning from user's profiles, income potential, life needs, and market performances. Data harvesting via social networks also allows users to be presented with different options relevant to them. Embodiments include an artificial intelligence engine that may use anomaly detection, association rule learning, and clustering to present users with relevant information.

Further, disclosed herein are systems and methods capable of addressing the above-described shortcomings and may also provide any number of additional or alternative benefits and advantages. For example, the embodiments described herein may include a software financial planner for life that learns and grows with the user. As a child, embodiments may be used to get paid for chores done, accumulate money to set goals etc. As a parent, the same can be used to help ones' kids get financial education. As a teenager or adult, one can plan for the next steps in life such as college, house, wedding, kids, retirement etc. In embodiments, an application may learn about users' styles based on various decisions one makes with the investments and provides one with timely advice on how to improve chances of financial success. Embodiments may be tied to bank accounts in the back end and may have the ability to seamlessly transfer money at the tap of a button.

In one embodiment, a method comprises receiving, by a server, a user profile from a user via a user interface, wherein the user interface is displayed on a computing device operated by the user; determining, by the server, a set of user attributes based on the user profile, wherein the set of user attributes comprise a first set of configuration parameters; determining and displaying on the user interface, by the server, a first set of goal options to the user based on the first set of configuration parameters, wherein the user interface includes timeline for a goal and selectable options for configuring the goal; receiving, by the server, a first selection of goal options from the user via the user interface; storing, by the server, the first selection of goal options, the set of user attributes, the first set of configuration parameters in a database, wherein the database stores data from different users; creating, by the server, an artificial intelligence model based on data associated with different users in the database, wherein the artificial intelligence model analyzes selections of goal options from different users with similar user attributes, wherein the artificial intelligence model determines recommendation of goal options by statistically clustering and classifying sets of configuration parameters and selections of goal options associated with different users; determining, by the server, a second set of goal options for the user based on the recommendation of goal options according to the artificial intelligence model; updating, by the server, the user interface to display the second set of goal options on the computing device, wherein the updated user interface includes selectable links, each configured for presenting additional information about the goal options; iteratively monitoring, by the server, a change of user profile when the user selects a second user profile, wherein a second set of configuration parameters associated with the second user profile is different from the first set of configuration parameters; and upon determining a third set of goal options based on the second set of configuration parameters using the artificial intelligence model, updating, by the server, the user interface to display the third set of goal options.

In another embodiment, a system comprises a computing device; and a server in communication with the computing device, wherein the server is configured to: receive a user profile from a user via a user interface, wherein the user interface is displayed on the computing device operated by the user; determine a set of user attributes based on the user profile, wherein the set of user attributes comprise a first set of configuration parameters, wherein the user interface includes timeline for a goal and selectable options for configuring the goal; determine and display on the user interface, a first set of goal options to the user based on the first set of configuration parameters; receive a first selection of goal options from the user via the user interface; store the first selection of goal options, the set of user attributes, the first set of configuration parameters in a database, wherein the database stores data from different users; create an artificial intelligence model based on data associated with different users in the database, wherein the artificial intelligence model analyzes selections of goal options from different users with similar user attributes, wherein the artificial intelligence model determines recommendation of goal options by statistically clustering and classifying sets of configuration parameters and selections of goal options associated with different users; determine a second set of goal options for the user based on the recommendation of goal options according to the artificial intelligence model; update the user interface to display the second set of goal options on the computing device, wherein the updated user interface includes selectable links, each configured for presenting additional information about the goal options; iteratively monitor a change of user profile when the user selects a second user profile, wherein a second set of configuration parameters associated with the second user profile is different from the first set of configuration parameters; and upon determining a third set of goal options based on the second set of configuration parameters using the artificial intelligence model, update the user interface to display the third set of goal options.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

FIG. 15 illustrates a flowchart depicting operational steps of an exemplary method, according to an embodiment.

DETAILED DESCRIPTION

Figure 1:
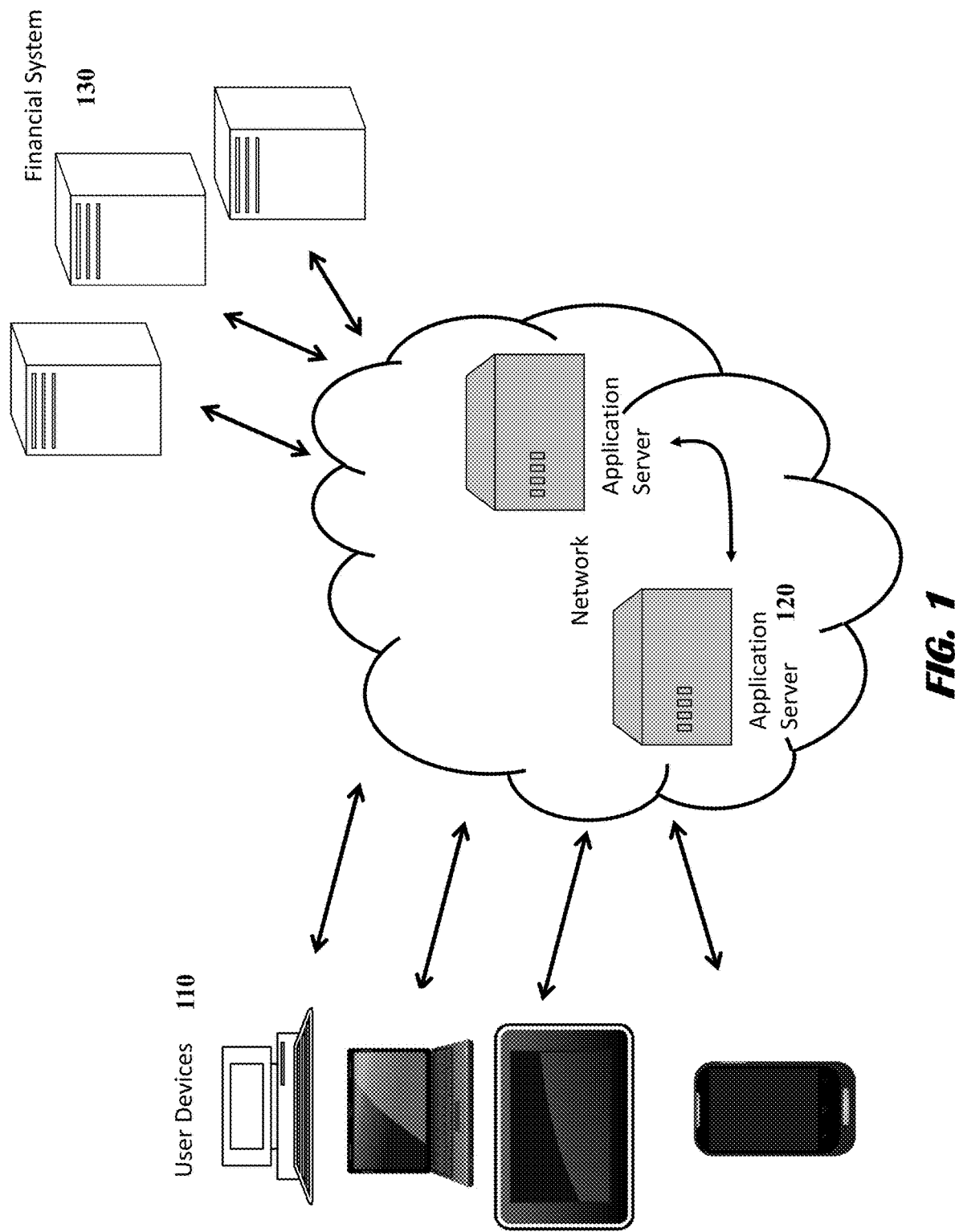
FIG. 1 illustrates components of an exemplary system, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments of the invention include a software application which grows with people for life. At a young age, users may use the application where they may be educated about finances and financial instruments appropriate for their age. The application may modify via artificial intelligence as the user grows old and their goals are set. For example, at a young age the user may use it as a game, and then when they turn eight years old, it may present more information regarding chores and/or goals. Embodiments may allow parents or guardians to interact with the children so that they can keep track of what they are doing and make recommendations along the way.

Similarly, parents for example, may identify chores for specific kids and check whether or not they have accomplished them. Tracking may be used which includes the parents logging in and certifying that the chores were performed. Financial accounts may be tied to each or all of the users. Therefore, the parents may be able to transfer money to the child after a chore is completed. Embodiments may include integration with a banking system or financial institution.

In some embodiments, artificial intelligence will gather data from the user, and make recommendations based on their profile and preferences. The user(s) may have access to all their finances in one place. Spending or other financial goals may be set and progress tracked. Patterns may be identified at each stage and the artificial intelligence may present one with information or education as to what the next financial steps may be.

Embodiments similarly may include an application or data service which a user interacts with on his/her mobile device. Included within the interaction is an interface that presents user and profile specific recommendations over the course of the user's life. The application may communicate with an application server in a network. The application server may in turn communicate with financial systems/machines.

FIG. 1 illustrates components of an exemplary system, according to an embodiment. The exemplary system may include one or more user devices 110, application server(s) 120 in a network and one or more servers of a financial system 130. For example, user devices 110 may be a cellphone, tablet, laptop, or personal computer. The user devices 110 are computing devices that include a display for presenting a graphical user interface, which may be presented by an application or on a web browser. FIGS. 2 to 14 illustrate graphical user interfaces that may be displayed on user devices 110. The application or web browser receives data from the financial system 130 to present on the display.

Financial system 130 may include one or more servers or networks, which may provide access to user's accounts or product information. The servers in financial system 130 may include or be associated with one or more databases. The databases can store account information (e.g., account number, balance, transactions) associated with a user as well as product information. The account information may also identify attributes of the user. For example, a financial system 130 may include a server that provides access to insurance accounts as well as information about related financial products. In another example, a financial system 130 may include a banking server or data center that provides access to bank accounts, investment accounts, and/or trust accounts.

The network may include one or more application servers housed in the same or different locations. In some embodiments, user devices 110 may access an application server 120 through an Internet Protocol (IP) network or a telecommunications system, such as a Third Generation (3G) mobile phone system. The network may include several application servers 120, each may host a portion or all of the application. For example, one server may host the database of users' profiles, while another server may host the application software and updates itself. Some embodiments include an artificial intelligence system, which may learn from users' profiles' data, choices, and actions.

The application server 120 hosts the application or the data presented on the graphical user interface of the user devices 110. The application server 120 also receives information from the financial system 130, including information about the user of the user device, products of the user of the user device, as well as other products that may be used by the user of the user device. In one alternative, the application server 120 may store attributes of each user.

The application server 120 has a processor and a non-transitory computer-readable medium, which includes data and instructions executed by the processor. The application server 120 is programmed to generate an artificial intelligence model using information about other users in the financial system 130. The artificial intelligence model can analyze selections of goal options from different users based on a similarity of user attributes (e.g., ages within a range of ages, net worth within a range of net worth). The application server 120 obtains configuration parameters and selections of goal options from the different users, then the artificial intelligence model clusters and classifies these parameters and selections to present a recommendation of goal options to the user.

In one example, the application server 120 uses classifiers and statistical learning methods. For example, kernel methods, Gaussian mixture models, naive Bayes classifier, decision trees and neural networks may be used. Pattern analysis in a kernel method may take clusters, rankings, principal components, correlations etc. In one example, pattern analysis may be performed on users who set goals for college savings. Despite age, users with earlier identified savings goals may be presented with information on more mature products such as 401k or investment tools.

The application server 120 may perform clustering on different user groups. For example, different age groups may be classified together and data analyzed. Structured data analysis may similarly be used for groups with a certain age classification, salary range, similar spending habits, identified goals, or locations etc. Types of structured data analysis may include combinatorial, functional data, shape analysis, tree structured data analysis, and regression analysis. It will be appreciated by one in the art that a combination of these methods may be used to make recommendations as the user of the program matures in age.

Figure 2:
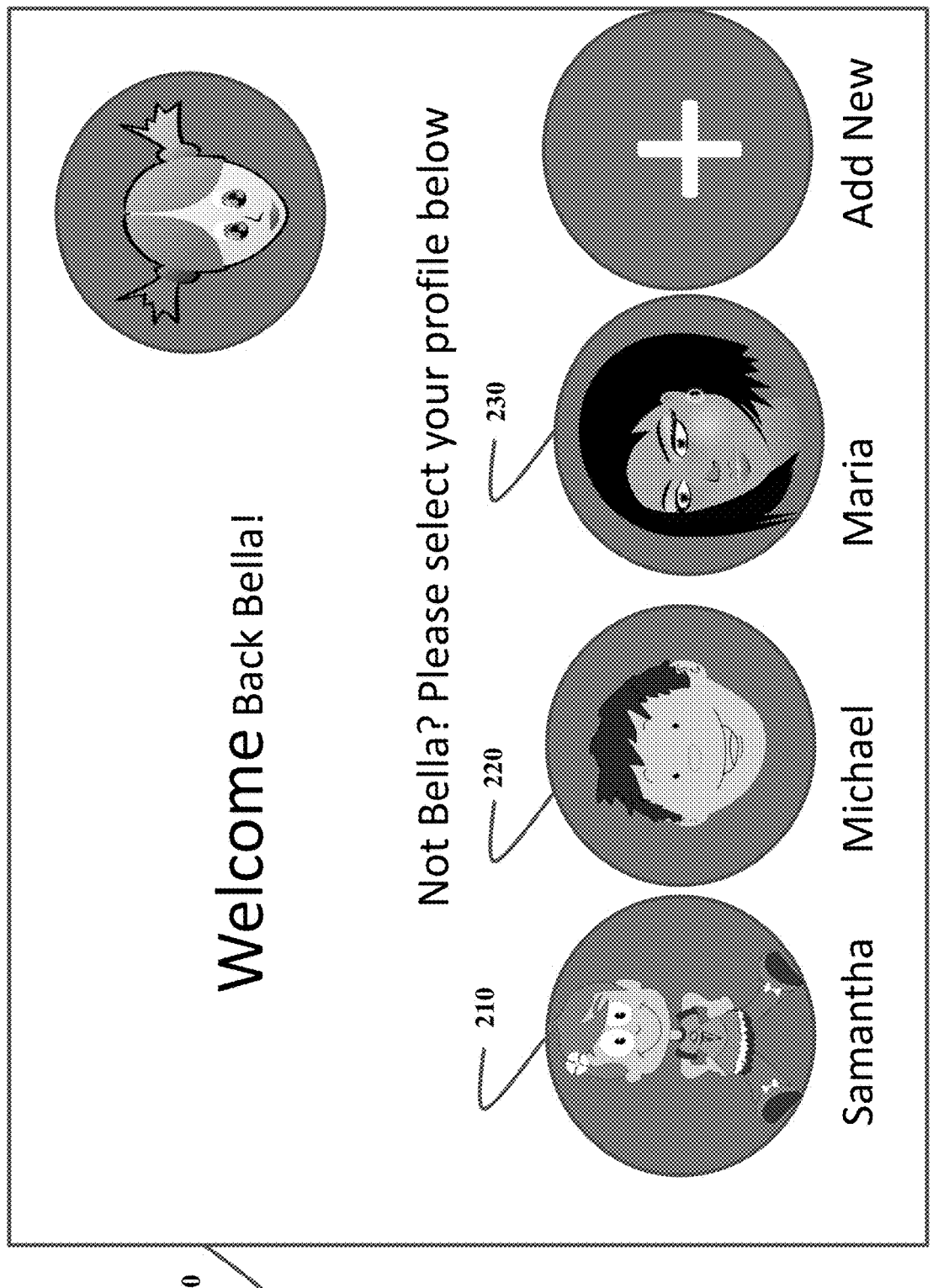
FIG. 2 illustrates an exemplary entrance screen or splashscreen, according to an embodiment.

FIG. 2 illustrates an exemplary entrance screen or splashscreen of the graphical user interface (GUI) displayed on the user device. On the entrance screen, users may be able to select a profile. For example, Bella is illustrated in the top right. Bella may choose her profile picture in order to enter her account. The entrance screen may be displayed on a user device such as a mobile phone or on a personal computer shared by family members. As illustrated Samantha, Michael, and Maria are all users as well, and the user may be changed. In order to access an account a password or secret code may be entered when a user attempts to access their account. A new profile may similarly be added to the group/family. In an embodiment, the application server may display the GUI 240 that comprises multiple GUI components, such as GUI components 210-230. Each GUI component comprises an interactive hyperlink displayed as an interactive box, configured to be engaged by the user. Furthermore, each interactive box may represent a different profile corresponding to different users and may also comprise a graphical element (e.g., image, gif, and the like) that represents the user.

When Bella's account is chosen (e.g., when the application server receives an indication that a user operating the user devices has engaged with the interactive hyperlink displayed in the GUI), the user profile may be retrieved from the application servers or from the user's device. For example, upon receiving an indication that a user operating the user device has interacted (e.g., clicked on) the interactive hyperlink corresponding to Bella's account, the application server may query Bella's account and receive Bella's profile. In some embodiments, the user's device may store all or part of the profile in order to facilitate the artificial intelligence system.

Figure 3:
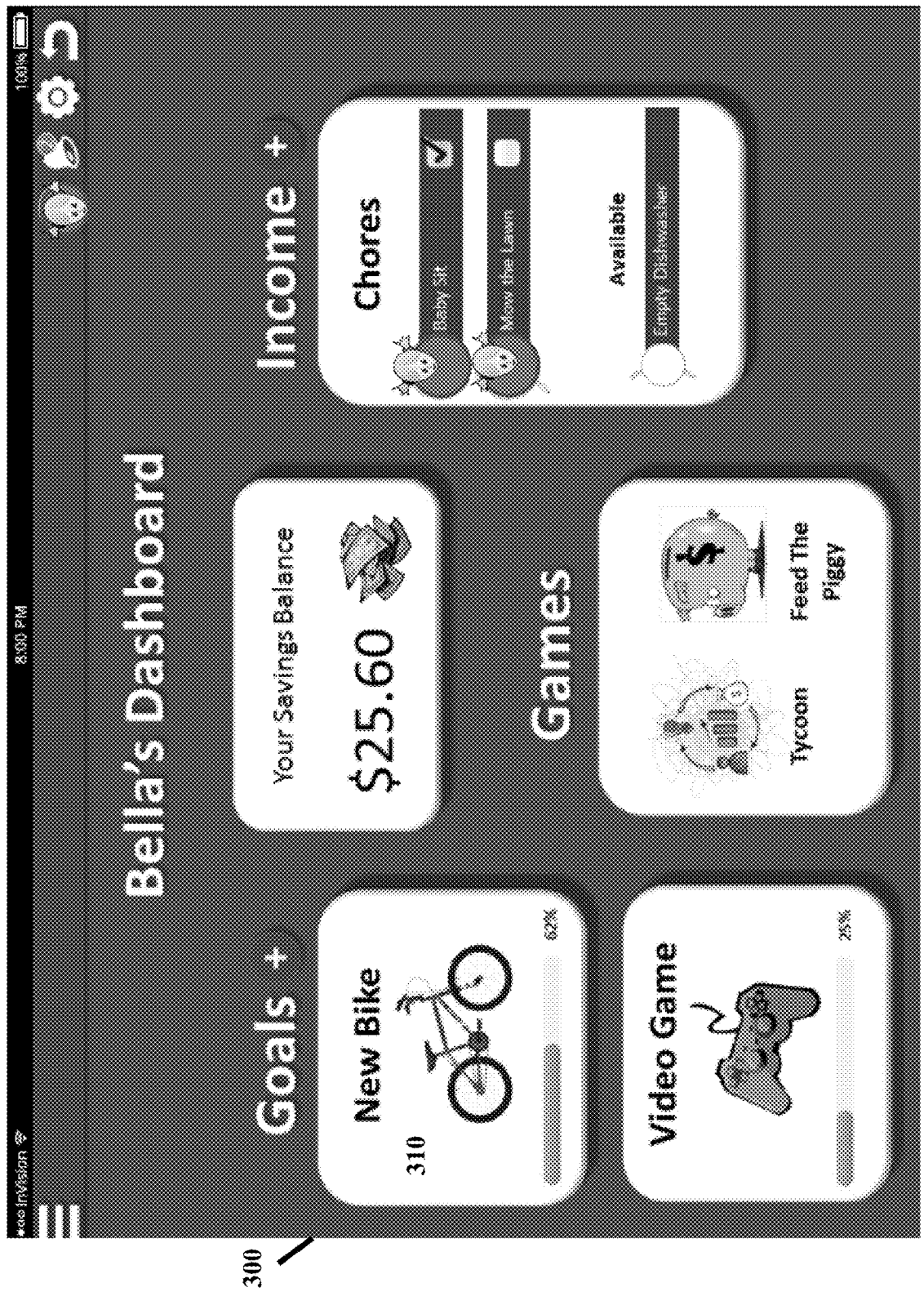
FIG. 3 illustrates an exemplary dashboard for a user, according to an embodiment.

FIG. 3 illustrates an exemplary user dashboard of the graphical user interface displayed on the user device. As illustrated, the application server may display the user dashboard GUI 300 on the user device for Bella, which may include one or more interactive hyperlinks (e.g., interactive boxes) that represent goals, financial accounting information, games, video games, chores and the ability to add new data items. These items are illustrated as exemplary and more and less features may be added as appreciated by one in the art. Upon the application server receiving an indication that the user has interacted with any of the interactive boxes, the application server may render a new GUI that corresponds to the interacted box. For example, in the illustrated embodiment, the application server receives an indication that the user has interacted with the interactive box 310. The application server may then render GUI 400 described in FIG. 4.

Figure 4:
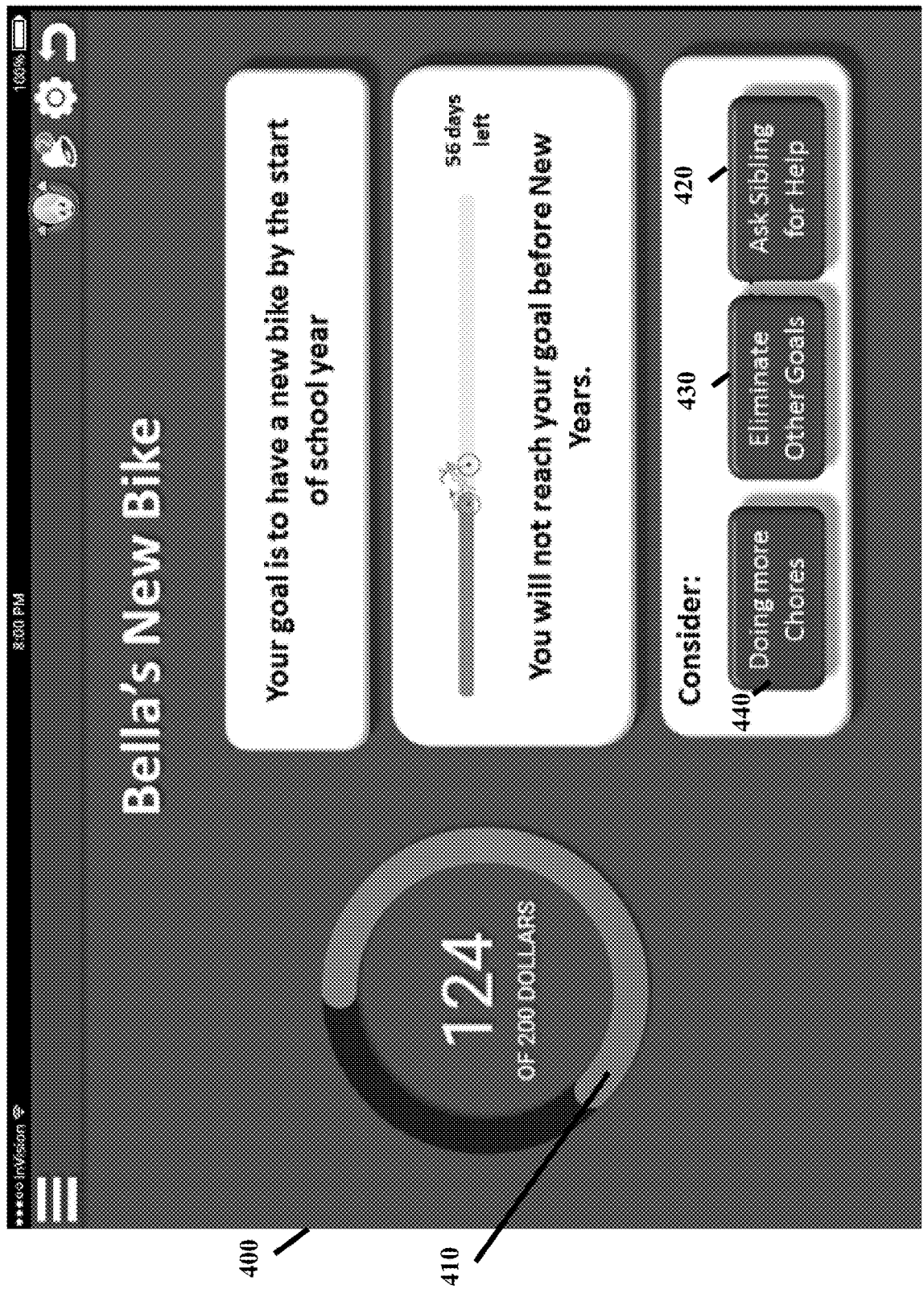
FIG. 4 illustrates an exemplary goal description screen, according to an embodiment.

FIG. 4 illustrates an exemplary goal description screen of the graphical user interface displayed on the user device. In the goal description screen GUI 400, the application server may display multiple GUI components to display a progress status of the goal (e.g., how close Bella is to achieving the goal of purchasing a bike). Consistent with the system diagram described in FIG. 1, the application server may query the database and receive account information (e.g., the amount of money saved for the bike) and update GUI component 410 accordingly. In the illustrated embodiment, Bella has saved 124 out of 200 dollars toward the bike. In some embodiments, a timeline for the goal may be listed. Options for enhancing the possibilities of achieving the goal may be included (e.g., the application server may display one or more interactive boxes providing different goal-related options to the user). For example, reprioritization of the goal as opposed to other goals may be included (e.g., interactive box 440). User may choose to eliminate this or other goals, or reallocate part of the savings between the goals by engaging (e.g., clicking on) the interactive box 430. To adjust to meet her goal, Bella, for example, may request a loan from a sibling by engaging the interactive box 420. Similarly, when Bella is presented or chooses the option to receive a loan she may be presented education material to introduce her to the concept of loans and/or interest. For example, the educational material may be on-screen in a paragraph/text format. Similarly, Bella may be presented with downloadable documents relevant to her. Bella may also be presented with links for further educational materials or relevant websites such as government resources.

Figure 5:
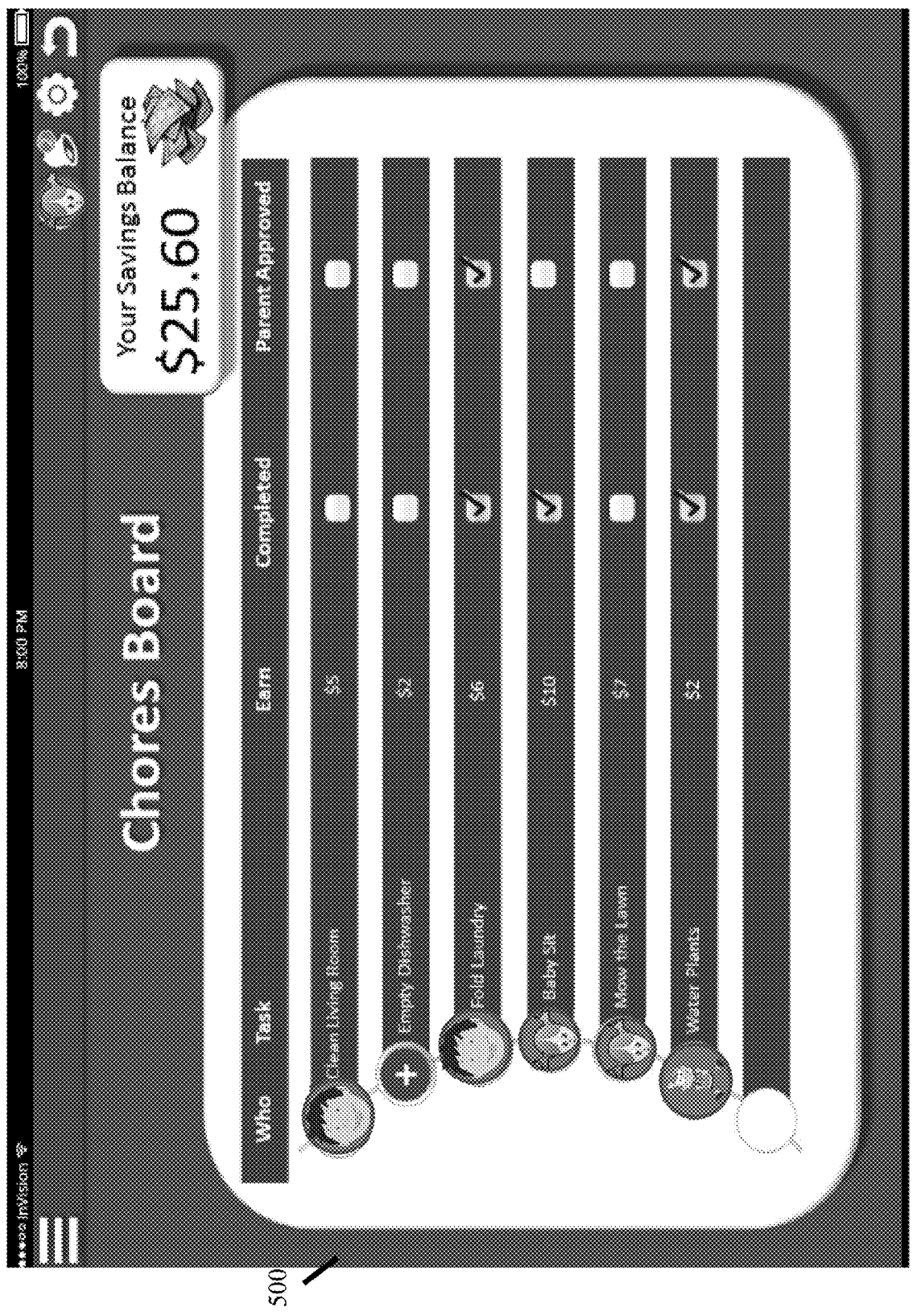
FIG. 5 illustrates an exemplary chores board interface, according to an embodiment.
Figure 6:
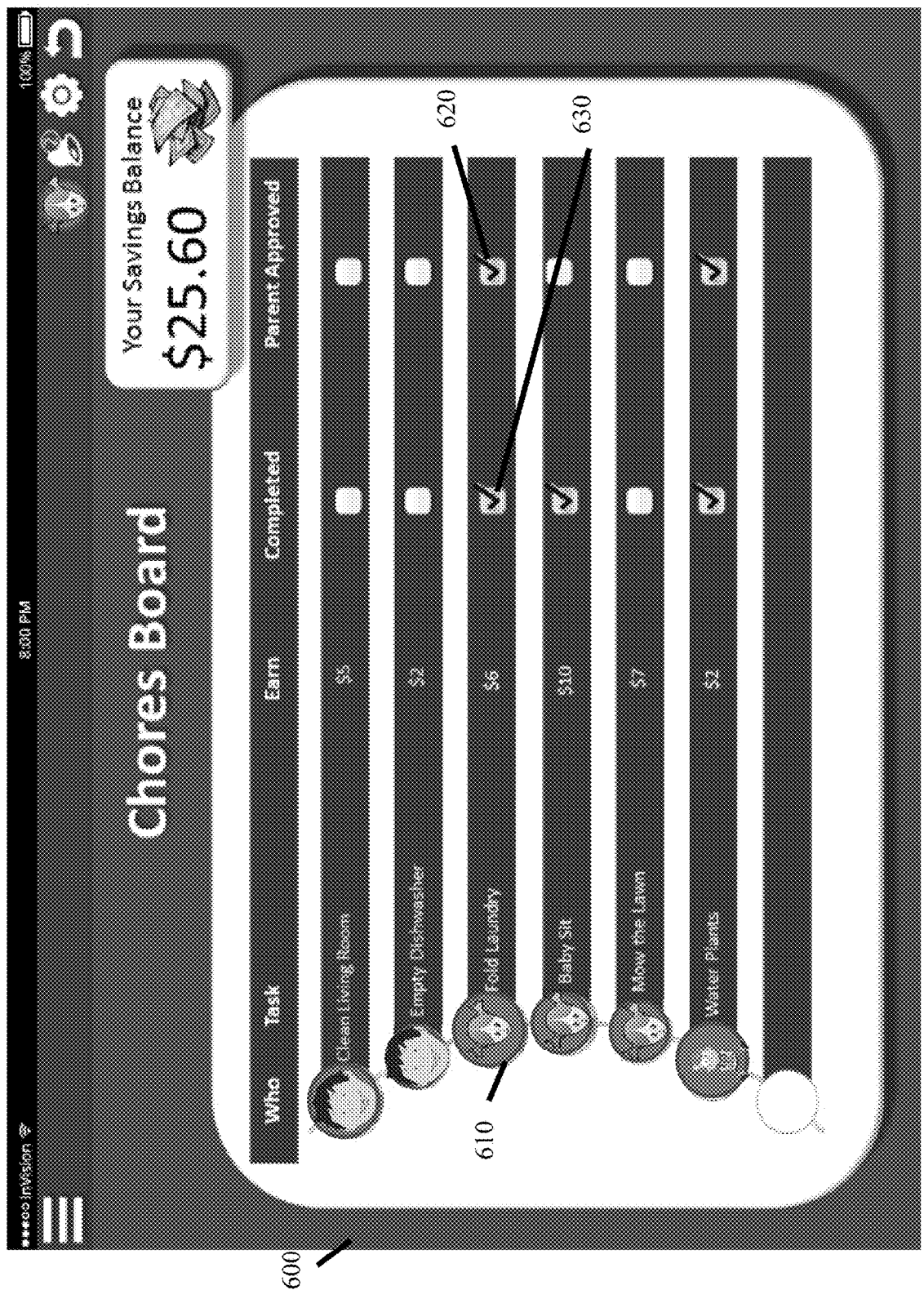
FIG. 6 illustrates how a user may be added or assigned to a chore, according to an embodiment.

FIG. 5 illustrates an exemplary chores board GUI 500 displayed on the user device. FIG. 6 illustrates how a user may be added or assigned to a chore using the graphical user interface 600 displayed on the user device. In some embodiments, a user may be presented with a GUI component (e.g., GUI component 610), which indicates the status of user's chores, as well as other family members. For example, the application server may query a database and receive data corresponding to the user's chores and display the chore status utilizing the GUI component 610. The GUI component 610 may also include one or more interact-able GUI boxes, such as radio button 620 that allows the user to indicate the completion of a chore or allows the parents to approve the completion. Upon receiving an indication that the chore is completed and approved, the application server may transmit an instruction to the database to alter a data record corresponding to a status of the chore. For example, upon Bella indicating that she has folded the laundry (by interacting with the radio box 630) and Bella's parents approving this chore (by interacting with radio box 620), the application server may modify a data record corresponding to a status of Bella's chores to indicate a "completed" status. It will be appreciated by one in the art that other options may be available such as comments field, organization classifications, and a submit request button. In some embodiments a parent may indicate how much to allocate to a chore. In other embodiments, a child or subordinate user may submit bids against other family members or for higher value earnings.

When a user selects options a request may be submitted to application servers which track data locally. The data may be stored on the application servers in any of a number of ways so that the artificial intelligence system learning may take place. For example, data for each user may be stored in a file dedicated to the whole family. In another example, the data may be stored in accumulated fashion with respect to all users. This data accumulation may be stored in a data structure such as a hash, a linked list, a binary tree etc. Using the accumulated data, artificial intelligence probabilistic and statistical calculations may take place.

Examples of artificial learning mechanisms include artificial neural networks, and data mining. Methods to be used in some of the embodiments may include anomaly detection, association rule learning, clustering, classification and/or regression analysis for data mining. Similarly some of the networks used for artificial neural networks may include feed-forward or feedback loops, supervised learning, reinforcement learning, back propagation algorithms and Bayesian networks.

To illustrate, an application server may collect data from thousands or millions of users, and apply regression analysis to determine recommended goals or chores. For example, if millions of users have chosen "clean kitchen" as a chore for a certain age group, the application server may make a recommendation to add "clean kitchen" as a chore for a child who is 10 years old. In this way, embodiments of the application may progress with a user over the course of their lifetime.

In another example, if a user has been using the application for several years, the application server may have gathered enough data on the user to understand their spending habits, as well as abilities toward success. Based on these habits, the application may make recommendations for certain financial products such as insurance, renters insurance, home insurance etc.

Figure 7:
FIG. 7 illustrates an exemplary dashboard for another user, according to an embodiment.

FIG. 7 illustrates an exemplary dashboard of the graphical user interface displayed on the user device. As is illustrated a user's dashboard GUI 700 may include goals, challenges, accounts, and assets. FIG. 7 illustrates how the user devices may be able to access all of their accounts in one place. As illustrated a user may track his/her checking accounts, savings accounts, credit cards, car loans and 401k in one place. To accomplish this tracking, application servers may access financial systems using their proprietary or open source Application Programming Interfaces (API) as well as ACH or wire transfers. The application server may display one or more interactable hyperlinks (e.g., interactable boxes) that represent one or more categories related to the user's data, such as goals, challenges, accounts, and assets. The number, content, category, or any display option associated with each interact-able box may be modified by each user. In an example, the application server may query the database (application server database and/or a local database associated with the user device) to receive account data of a user and display a graphical representation of the user's different accounts in the interactable box 710. upon receiving and indication that the user has interacted with the interactable box 710, the application server may then render another GUI that illustrates the account data in more detail (e.g., FIG. 8).

The interactable box 710 may include any or all goals for Maria as well as her kids. As illustrated the goals demonstrates savings, investments, retirement and vacation progress. Additionally, these sections may have specific dollar amounts or percentage accomplished.

The challenges section (e.g. interactable box 720) may include a score that is generated by the artificial intelligence system. The score may be compared to similar people. The score may be in part based on one's credit rating, for example.

Figure 8:
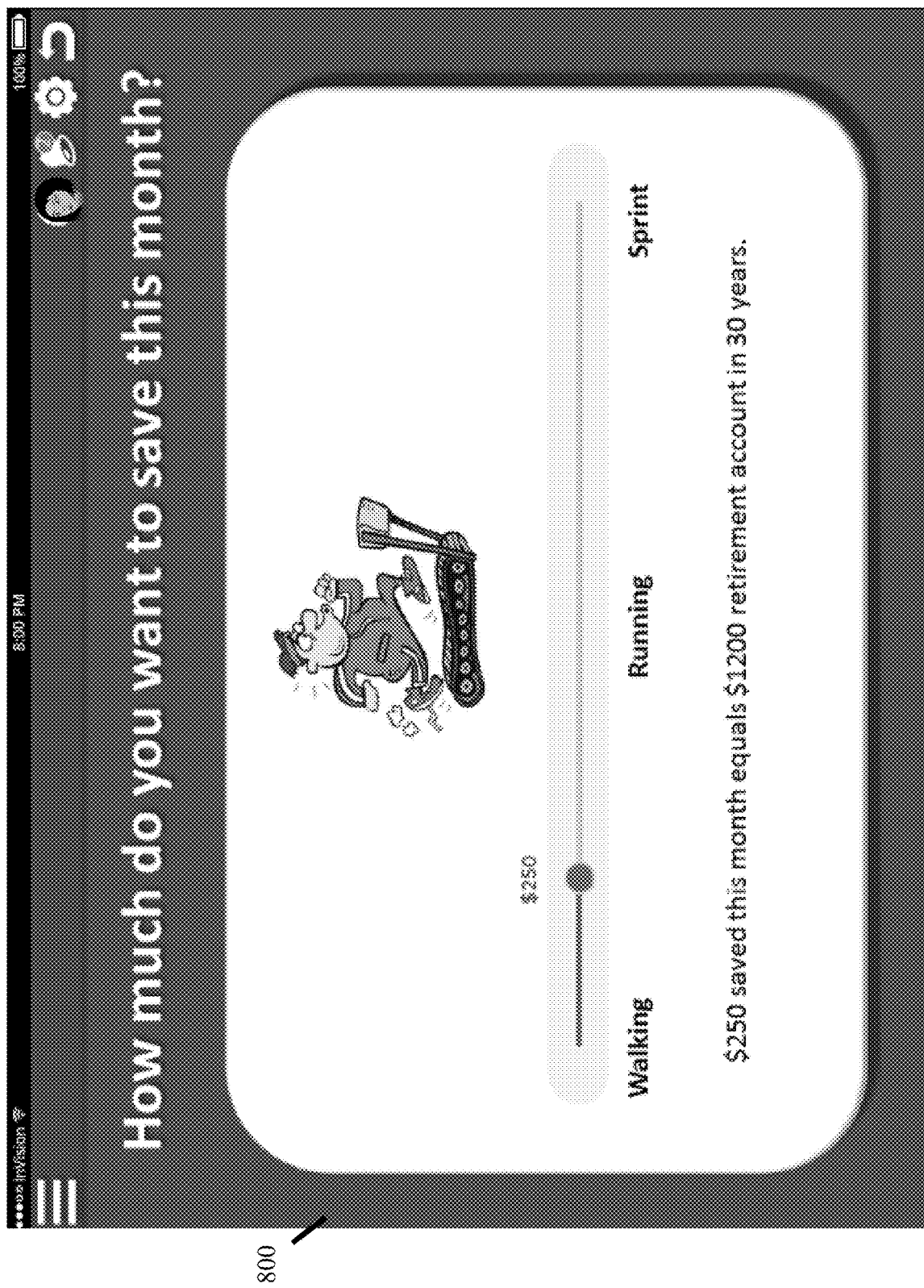
FIG. 8 illustrates an exemplary interface for progress toward a goal, according to an embodiment.

FIG. 8 illustrates an exemplary GUI 800 for progress toward a goal using the graphical user interface displayed on the user device. The GUI 800 may demonstrate how much of a goal has been achieved, as well as how long it may take to accomplish. In this example, a playful way of demonstrating how fast the goal will be achieved is demonstrated. As described above, the application server may query the data and use the received data to render the graphical representation of the user's savings.

Figure 9:
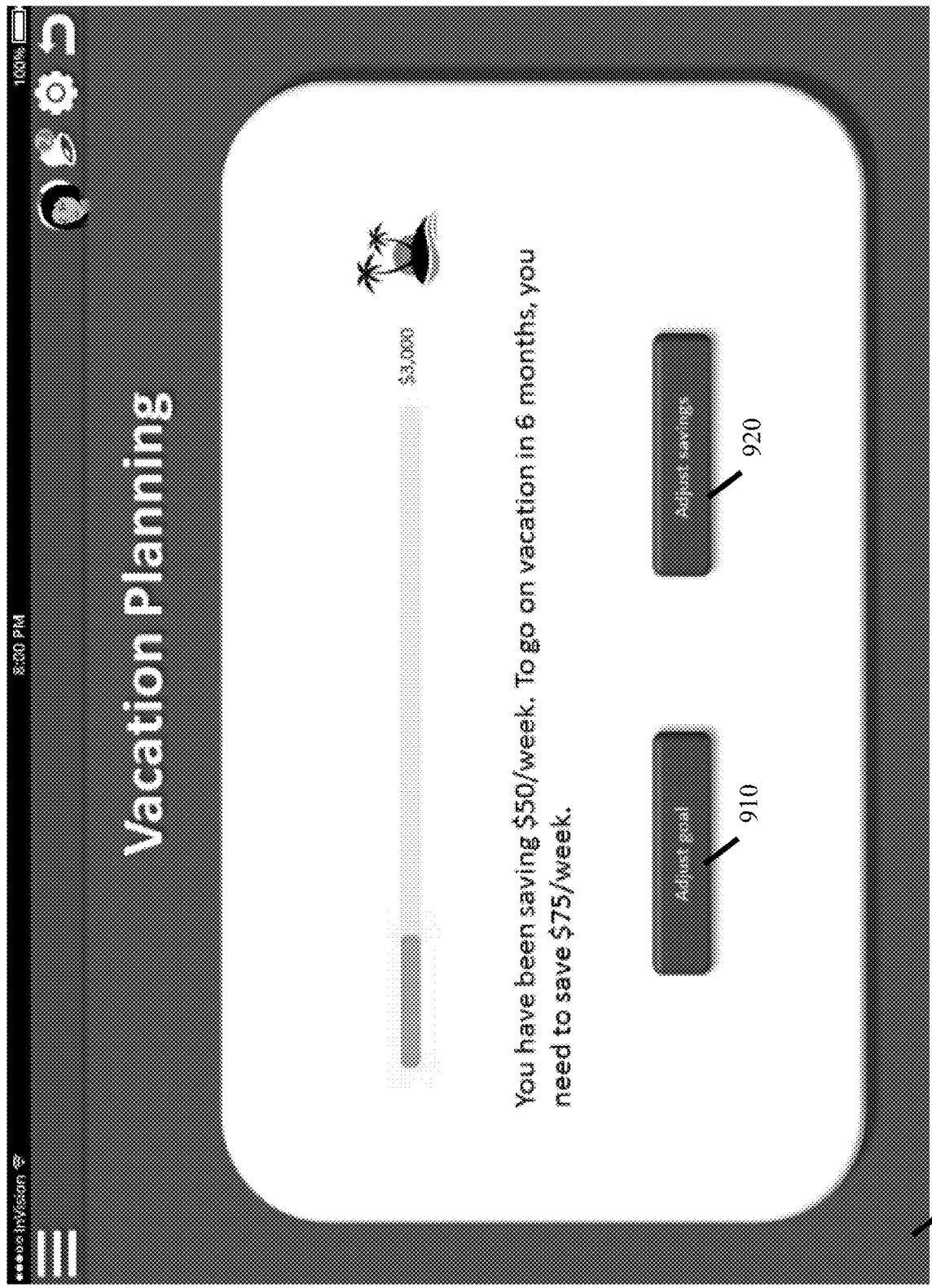
FIG. 9 illustrates an exemplary vacation planning interface, according to an embodiment.

FIG. 9 illustrates an exemplary vacation planning interface displayed on the user device. The application server may track data corresponding to a user's goals by querying the database and display a status of the user's goals. For example, GUI 900 displays a vacation goal (previously received from the user device) and an amount of actual savings by the user. Integrated with all of their financial information, a user is able to uniquely access all their information in one place. The GUI 900 may also include interact-able box 910 and 920, which are configured to allow the user to adjust the goal and adjust the savings amount towards that goal. Upon receiving an indication that the user has interacted with the interact-able box 920, the application server may render another GUI (not shown) configured to receive new savings data from the user device.

Figure 10:
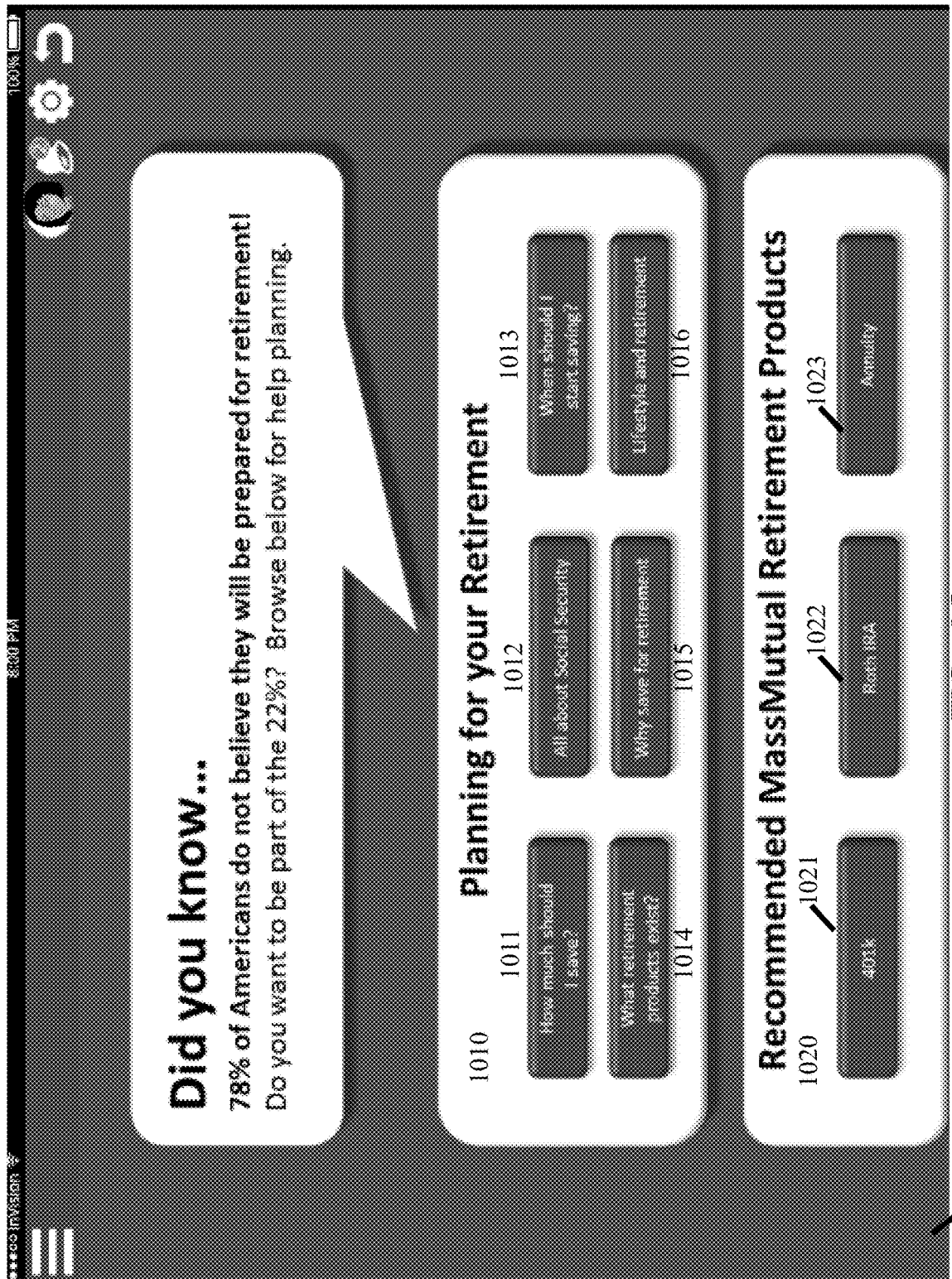
FIG. 10 illustrates an exemplary informational/suggestion page, according to an embodiment.

FIG. 10 illustrates an exemplary informational/suggestion page of the graphical user interface displayed on the user device. As illustrated, useful information or news may be displayed in GUI 1000. The graphical components of the GUI 1000 may be modified by the user and may be tailored based on the user's preferences and gathered data within the artificial intelligence system. In GUI component 1010, several interact-able boxes are presented. Each interact-able box may comprise a hyperlink that is configured to direct the user to a webpage that contains more information regarding the content of each interactable box. GUI component 1010 includes how much money to save (i.e., interactable box 1011), social security information (i.e., interact-able box 1012), when to start saving (i.e., interactable box 1013), retirement products listings (i.e., interact-able box 1014), reasons to save (i.e., interactable box 1015), and information regarding lifestyle and retirement (i.e., interactable box 1016). The GUI 1000 may also include GUI component 1020 that contains interactable boxes 1021-1023), which may direct the user towards webpages (or other electronic content including different GUIs rendered by the application server) regarding different products. The application server may utilize the artificial intelligence component described in FIG. 1 to select the products to be recommended to the user.

In an embodiment, the application server may receive user data associated with different users from a database and analyze the user data to identify users with one or more similar attributes by statistically clustering and classifying sets of configuration parameters (e.g., user's previously selected recommended products, age, financial stability, and the like) of different users. The application server may also user other statistical artificial intelligence models, such as random forest model, to identify similar users (with similar financial fingerprints) and recommend products based on similar user's selection of products. For example, if the user is a 35-year-old male with a good financial stability score, the application server may recommend one or more products to the user base on other users with good financial stability scores who are also within the same age range. The application server may also use each particular user's previous selections as a training model for refining the artificial intelligence model. For example, the user's previous selections (e.g., goal selection, range of risk-averse investments, income, amount of money saved, and the like) may be used as a training set to accurately predict the user's needs. The artificial intelligence model may use variety of different techniques to generate and continuously update a profile for each user using the user's selections and financial data. The application server may then compare each user's profile to similar profiles for other users and recommend products accordingly.

Additionally, as illustrated a user may be presented with specific financial products from certain companies, and/or specific products. Articles or video presentations may be used to educate and inform the user.

Figure 11:
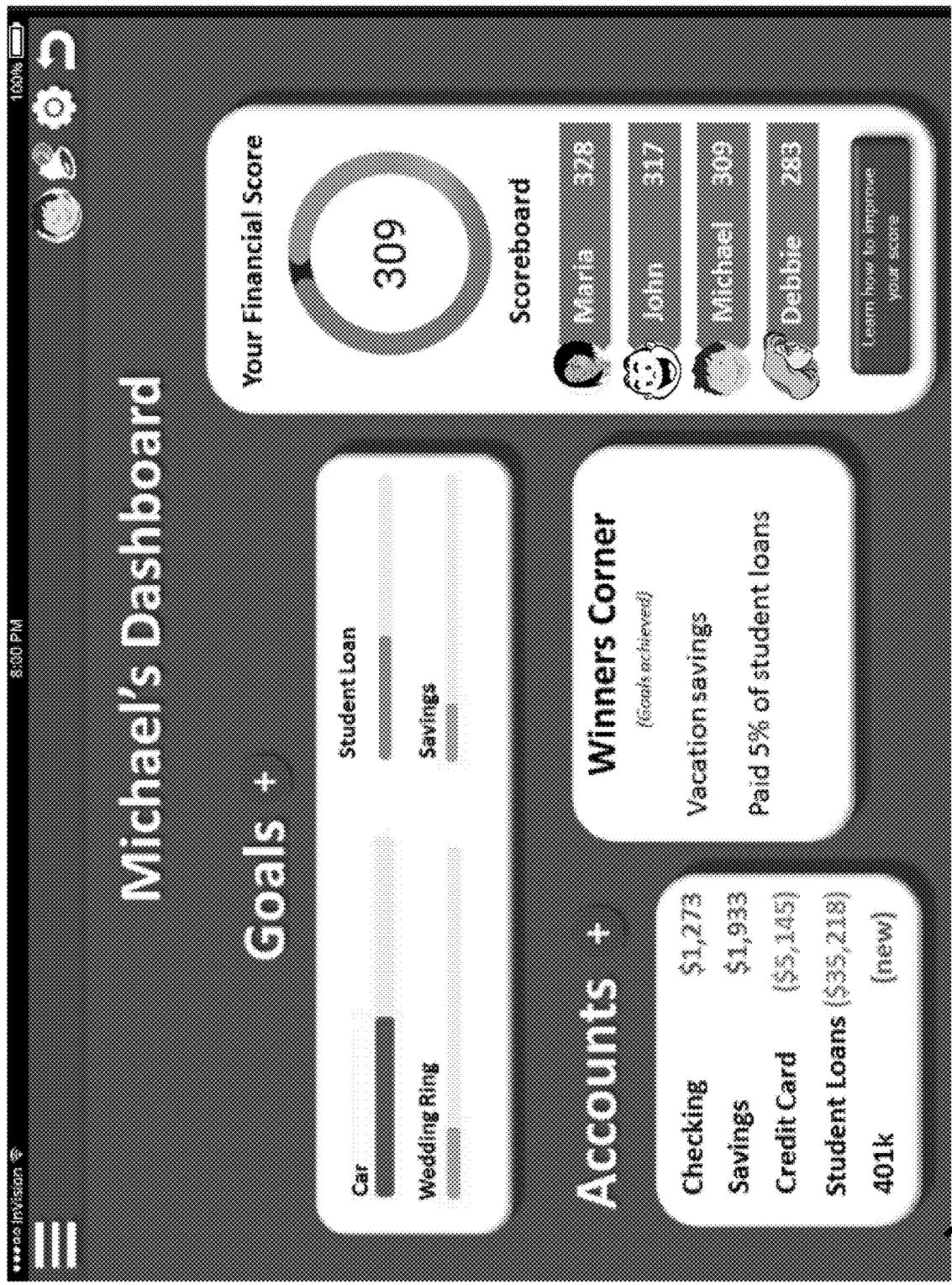
FIG. 11 illustrates an exemplary dashboard for another user, according to an embodiment.

FIG. 11 illustrates Michael's dashboard of the graphical user interface displayed on the user device. The dashboard GUI 1100 is similar to the dashboard GUIs described in FIG. 3 and FIG. 7. In dashboard GUI 1100, goals, accounts, achieved goals, and a relative score are displayed as GUI components. As discussed above, the score may be relative to a user's age group, or relevant demographic profile. For example, if one has much saved up for a 401k, they may be in a distinct group aligned with other successful savers. As is illustrated, the interface may include an indicator of successful goals achieved. Here this section is called Winner's Corner.

Figure 12:
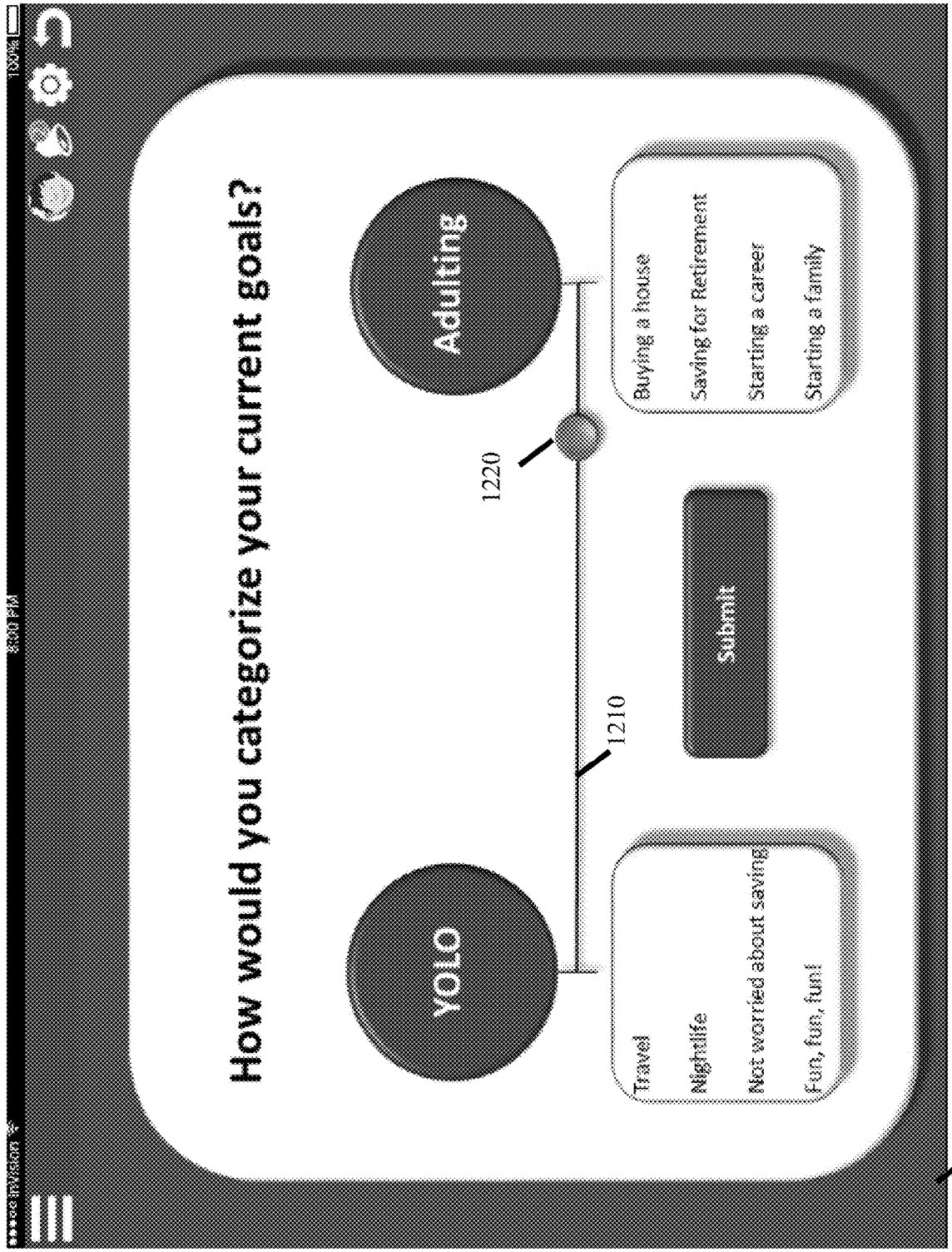
FIG. 12 illustrates an example of a user interface to categorize goals, according to an embodiment.

FIG. 12 illustrates how a user may categorize their goals using the graphical user interface displayed on the user device. As illustrated, GUI 1200 displays a graphical bar 1210 which illustrates a range of user's goals. For example, a user may categorize their goals as more risky, i.e. You Only Live Once (YOLO) or more risk-averse (e.g., Adulting). A user may vary the scale by interacting with the GUI components 1220 and dragging the GUI component 1120 toward the more conservative or risky. For example, a fully conservative approach may be that one plans to buy a house, save for retirement and a family. This may be towards the right in the picture. In another example, a user may prefer to spend more money upfront and plan less ahead of time, for example if they need the money at present. The application server may render GUI 1300 and select the GUI components (interact-able boxes 1310, 1320, and 1330) and the content of the GUI 1300 based on the user's selection.

Figure 13:
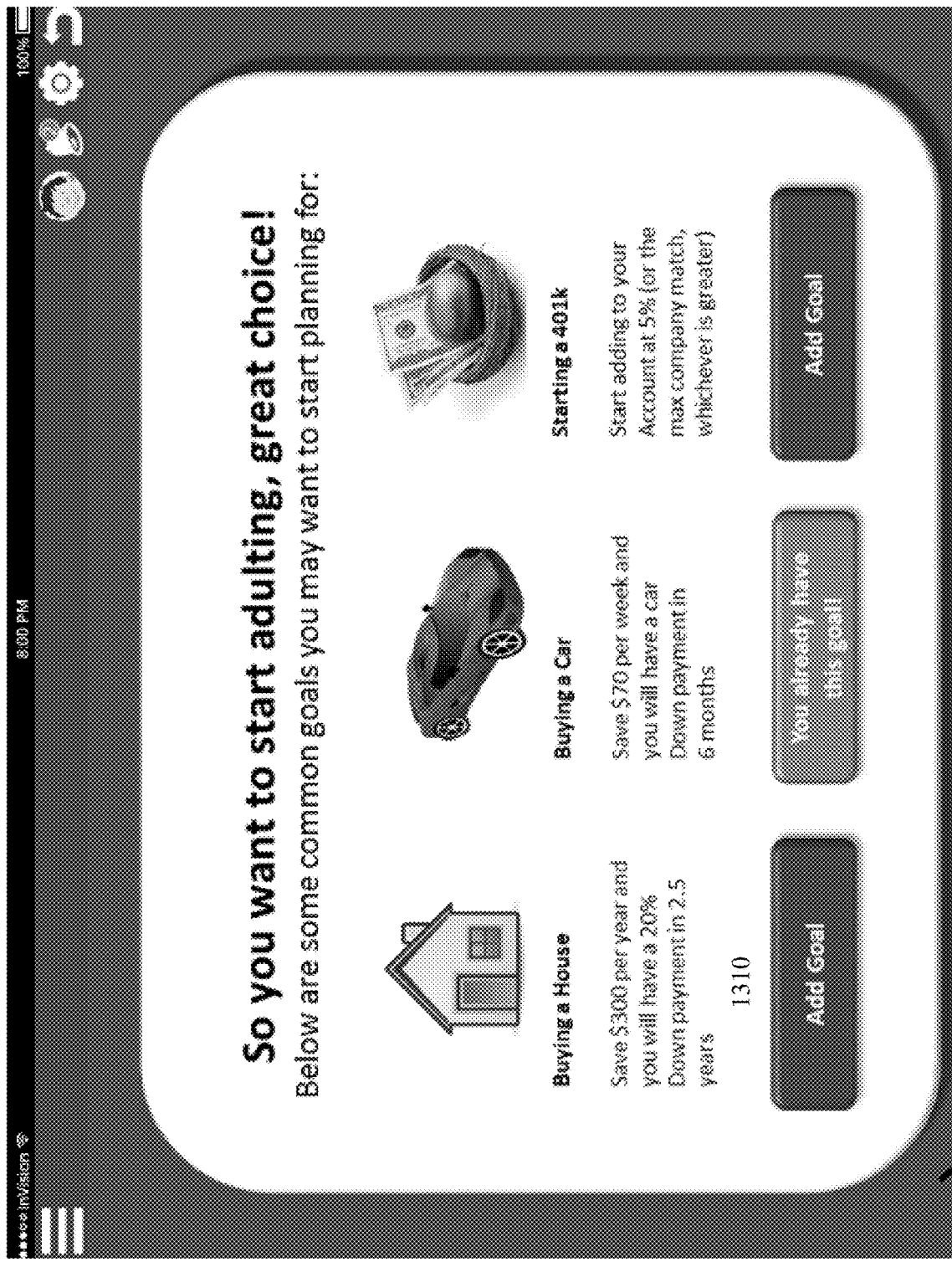
FIG. 13 illustrates an example of user interface providing several options to a user based on the user's preferences, according to an embodiment.

FIG. 13 illustrates several options that may be presented to a user based on their preferences using the graphical user interface displayed on the user device. As illustrated in FIG. 12, a user chose to be more conservative and start planning for a longer term. Therefore, the applications server selects content associated with more risk-averse goals and displays interact-able boxes corresponding to more risk-averse goals. For example, the application server may display the interact-able box 1310, which may direct the user to another GUI (displayed by the application server) that is configured to receive goal data from the user for buying a house.

Figure 14:
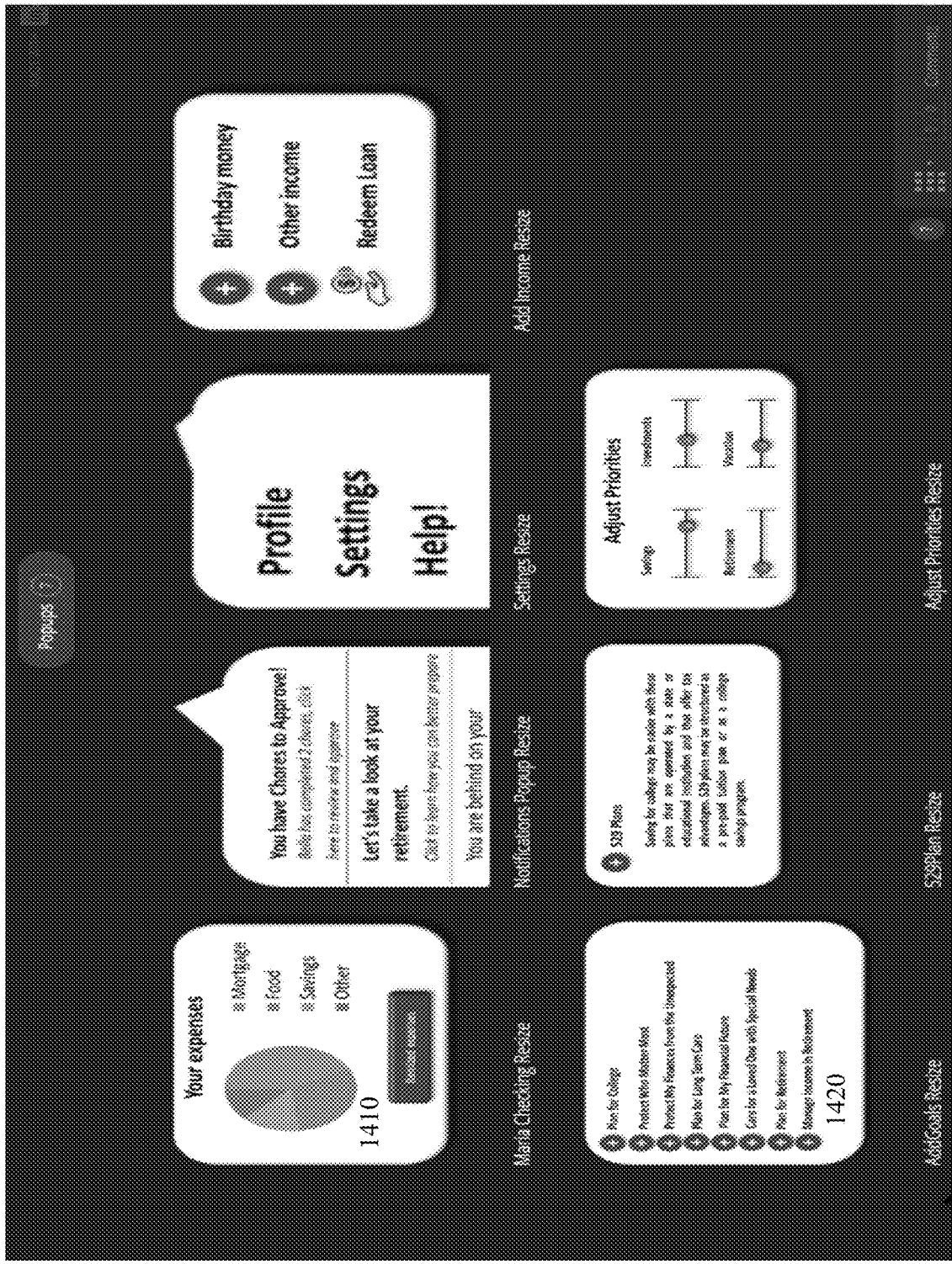
FIG. 14 illustrates an example of user interface providing several popup notifications, according to an embodiment.

FIG. 14 illustrates several popup notifications (e.g., GUI components), which may expand for a user using the graphical user interface displayed on the user device. GUI component 1410 illustrates a pie chart for expenses. In GUI component 1420, a user may be presented with graphical information on how their expenses or other costs are being allocated. the application server may query the database and receive account information (e.g., the amount of money saved for the bike) and update GUI components accordingly.

In the second from top left popup, information is displayed which include notifications on chores to approve, warnings regarding retirement, and goals progress. In the popup on the top right is an example of some options that may be checked to add information such as birthday money, or other income. In the bottom left, goals, which may be added are illustrated as a popup. Options listed include planning for college, protecting someone who matters such as a kid, protecting finances from unexpected, planning for long term care, planning for financial future, caring for a loved one with special needs, planning for retirement, and managing income in retirement. These are just exemplary and one in the art would appreciate any of several other goals being added.

In the middle bottom popup, is illustrated information regarding a 529 plan. This information may be relevant to a savings account, similarly any kind of financial account or recommendation information may be displayed. In the bottom right, a user may be able to adjust their priorities.

FIG. 15 illustrates an exemplary method to be performed in different embodiments. It will be appreciated by one in the art that the steps may be taken in different combinations and order. In the exemplary method, in step 1502, an application server may first receive a selection for a user profile. For example, a user may be presented with options from a family unit. A user may choose a parent or child's profile, and then subsequently be prompted for a login. Selection of a user profile may occur only once on a user's personal device, and then each time when a device such as a laptop is shared. Additionally a user may have the option of creating their profile for a first time login. Upon selection of a profile, a user may be prompted for information such as age, location, job, and account information.

In the next step 1504, an application server may retrieve profile information for a selected user. In some embodiments, retrieval of the profile information may be done by a user's device and queried through the application server. In some embodiments the profile may be stored locally and reproduced on an application server for data gathering purposes as well as backup. The user may be presented with goals and/or chore options, for example.

In some embodiments, as a child, one would be able to sign up for chores that their parents identified in the chore list. Similarly, the parents may see what chores each child is signed up for, be able to check off that that chore was complete, and then assign a monetary allowance to that child. The system may be integrated with either general banking systems or a specific banking system to allow the individual transfer of that money within the user interface.

In other embodiments, parent-child interaction may be as stages of life went on, one may be able to track all their finances in one place so one will be able to load their other accounts into the application and put everything in one spot.

In the next step 1506, the user may select preferences and/or goals. The goals and preferences may be sent to an application server for storage and management. For example, one may be able to set spending goals or other financial goals and track their progress towards them. Similarly, a user may say that they do not plan to purchase a car, or go to college, which may provide feedback for their plans.

In the next step 1508, the application server may store user choices in a local or distributed artificial intelligence system along with other users' data as described above. For example, life events such as marriage, having a kid, getting a new job, losing a job, or moving may be prompted and stored as options.

In the next step 1510, the application server may perform maintenance on the artificial intelligence system including aggregating and analyzing all of the users' data. For example, embodiments may work on identifying one's pattern, and analyzing patterns of use when a user is in the application. The system may use the life events or possible upcoming life events as a trigger for recommendations. In some embodiments, the artificial intelligence system may use income bracket to predict what recommendations or information to present.

In the next step 1512, the application server may present information to the user based on the profile. In this step, the application server may also present information utilizing data and analytics from the artificial intelligence system and/or selections from the user. The application server may feed the user information of an educational nature that would help them be prepared for what the next logical financial steps in their life are. The user may be presented with links, articles and/or videos specific to products or financial topics. Similarly, a score may be presented based on financial fitness.

The score may be based on whether one is checking their finances often enough, whether they are putting money in their savings account on a regular basis, meeting their financial goals etc. Based on the score the user may also be rewarded for example, with free financial consultation or a class.

In one example, a 35 year old user may be presented with the option of having a retirement account if they do not have one. Similarly, one may be able to set a goal of saving $3,000 for a vacation within a period of time, and if they are not making that date, according to the pattern, they are not going to make it, the system may present the user with advice on how to, either adjust or add more by presenting solutions towards their problem.

In another example, a user's score may be used to educate them by showing that their peers are more or less successful and why they are successful. For example, a sister may score 600 while her brother has 500. The brother may try to learn how to improve his score. Scores and goal settings within a peer group, across the country or outside of the family may also be done.

In one exemplary embodiment, a user, Michael who is 25 may click on his profile and the system may ask him what his financial goals are. Michael may be asked if he currently likes to travel, spend money on his night life, or save money to buy a house. Saving for a 401k may be recommended to him if he has indicated that he would like to save.

In another embodiment, social media may be used to access or update information. For example, a user's score may be posted or questions may be posted when a user has a question for his peers.

In another embodiment, a 16 year old may have access to their checking account through the graphical interface. The application server may access that information by communicating with one or more financial systems. The 16 year old may be able to receive transfers through the application from their parents or siblings bank accounts. The parents may be able to control the transfers as well as view their children's accounts and/or goals. Various games may be included in the 16 year old's interface including financial educational ones and such.

In another example, Michael may be saving for a car, and a wedding ring. Michael may have ⅓ of his student loans paid off. Michael may also have credit card debt. Michael may set goals for himself of paying 5% of his student loans in the next twelve months and save for a vacation. Michael may be able to compare his score to his parents, friends and siblings. Similarly, Michael may be presented with educational materials via the user interface. For example, Michael may be presented with information on where to focus his debt payment efforts. In one embodiment, Michael may be presented with material explaining why focusing on higher interest rate debt makes sense. For example, Michael may be educated about Loan To Value ratios. Similarly, Michael may be presented with graphs or charts on how his interest will affect things over time.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise Random Access Memory (RAM), Read Only Memory (ROM), Electrically Erasable Programmable Read-Only Memory (EEPROM), CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   determining, by a processor, a set of user attributes based on a user profile, wherein the set of user attributes comprises a first set of configuration parameters;
   presenting, by the processor for display on a user interface, a first set of goal options based on the first set of configuration parameters, wherein the user interface includes timeline for at least one goal option and selectable options for configuring the at least one goal option;
   receiving, by the processor, a first selection of goal options via the user interface;
   training, by the processor, an artificial intelligence model based on data associated with different users and their corresponding goal options to determine a recommendation of goal options by statistically clustering and classifying sets of configuration parameters and selections of goal options associated with different users;
   executing, by the processor, the artificial intelligence model to determine a second set of goal options for the user profile based on the recommendation of goal options;
   monitoring, by the processor, a change of user profile when a user associated with the user profile adds a second user profile having a second set of configuration parameters required by the change of the user profile;
   executing, by the processor, the artificial intelligence model to determine a third set of goal options based on combining the first set of configuration parameters and the second set of configuration parameters; and
   updating, by the processor, the user interface to display the third set of goal options.

2. The method of claim 1, further comprising:
   executing, by the processor, the artificial intelligence model to compare the user to other users with similar user profiles.

3. The method of claim 1, further comprising:
   presenting, by the processor, for display on the user interface, educational materials that the artificial intelligence model has identified for the user profile, related to particular financial situation, in time for the user to prepare for the particular financial situation.

4. The method of claim 1, wherein the artificial intelligence model performs anomaly detection using the user's selection of goal options and other users' selections of goal options.

5. The method of claim 1, wherein the user profile comprises data associated with at least one of gender, family structure, location, income, age, or work status.

6. The method of claim 1, wherein the user interface further displays options of chores comprising actions to be performed by the user.

7. The method of claim 1, wherein the user interface further displays bank accounts and assets associated with the user profile.

8. The method of claim 1, wherein the user interface further displays suggestions based on age, gender, family structure, location, income, and user preferences.

9. The method of claim 1, wherein the user interface comprises a graphical status indicator associated with at least one goal option.

10. The method of claim 9, wherein the at least one goal option corresponds to monetary savings.

11. A system comprising:
    a processor; and
    a non-transitory computer-readable medium comprising instructions that when executed by the processor, cause the processor to:
    determine set of user attributes based on a user profile, wherein the set of user attributes comprises a first set of configuration parameters;
    present for display on a user interface, a first set of goal options based on the first set of configuration parameters, wherein the user interface includes timeline for at least one goal option and selectable options for configuring the at least one goal option;
    receive a first selection of goal options via the user interface;
    train, by the processor, an artificial intelligence model based on data associated with different users and their corresponding goal options to determine a recommendation of goal options by statistically clustering and classifying sets of configuration parameters and selections of goal options associated with different users execute the artificial intelligence model to determine a second set of goal options for the user profile based on the recommendation of goal options;

monitor a change of user profile when a user associated with the user profile adds a second user profile having a second set of configuration parameters required by the change of the user profile;

execute the artificial intelligence model to determine a third set of goal options based on combining the first set of configuration parameters and the second set of configuration parameters; and update the user interface to display the third set of goal options.

12. The system of claim 11, wherein the instructions further cause the processor to:

execute the artificial intelligence model to compare the user profile to other users with similar user profiles.

13. The system of claim 11, wherein the instructions further cause the processor to:

present, for display on the user interface, educational materials that the artificial intelligence model has identified for the user profile, related to particular financial situation, in time for the user to prepare for the particular financial situation.

14. The system of claim 11, wherein the artificial intelligence model performs anomaly detection using the user's selection of goal options and other users' selections of goal options.

15. The system of claim 11, wherein the user profile comprises data associated with at least one of gender, family structure, location, income, age, or work status.

16. The system of claim 11, wherein the user interface further displays options of chores comprising actions to be performed by the user.

17. The system of claim 11, wherein the user interface further displays bank accounts and assets associated with the user profile.

18. The system of claim 11, wherein the user interface further displays suggestions based on age, gender, family structure, location, income, and user preferences.

19. The system of claim 11, wherein the user interface comprises a graphical status indicator associated with at least one goal option.

20. The system of claim 19, wherein the at least one goal option corresponds to monetary savings.

* * * * *